US006993166B2

(12) United States Patent
Lo et al.

(10) Patent No.: US 6,993,166 B2
(45) Date of Patent: Jan. 31, 2006

(54) METHOD AND APPARATUS FOR ENROLLMENT AND AUTHENTICATION OF BIOMETRIC IMAGES

(75) Inventors: Peter Z. Lo, Lake Forest, CA (US); Behnam Bavarian, Newport Coast, CA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/838,617

(22) Filed: May 3, 2004

(65) Prior Publication Data

US 2005/0129290 A1 Jun. 16, 2005

Related U.S. Application Data

(60) Provisional application No. 60/529,804, filed on Dec. 16, 2003.

(51) Int. Cl.
*G06K 9/00* (2006.01)

(52) U.S. Cl. ...................................... 382/124; 382/218

(58) Field of Classification Search ................ 382/124, 382/125, 115, 116, 209, 218, 270; 358/3.22
See application file for complete search history.

(56) References Cited

U.S. PATENT DOCUMENTS 5,909,501 A * 6/1999 Thebaud ..................... 382/124
5,917,960 A * 6/1999 Sugawa ...................... 382/278
5,943,448 A * 8/1999 Tatsuta ....................... 382/270
6,111,517 A * 8/2000 Atick et al. ................ 340/5.83
6,141,436 A 10/2000 Srey et al.
6,259,805 B1 * 7/2001 Freedman et al. .......... 382/124
6,268,611 B1 * 7/2001 Pettersson et al. ....... 250/559.3
6,483,930 B1 * 11/2002 Musgrave et al. .......... 382/117
6,636,634 B2 * 10/2003 Melikian et al. ............ 382/217
6,853,739 B2 * 2/2005 Kyle .......................... 382/115
2005/0084154 A1 * 4/2005 Li et al. ..................... 382/190

* cited by examiner

*Primary Examiner*—Daniel Miriam
*Assistant Examiner*—O'Neal R. Mistry
(74) *Attorney, Agent, or Firm*—Valerie M. Davis

(57) ABSTRACT

A method for enrolling biometric images including the steps of: a) capturing (310) a plurality of images for a user into a capture folder; b) selecting (318) one of the plurality of images in the capture folder and removing the selected image from the capture folder to an enroll folder; c) comparing (322) the selected image to each of the remaining images in the capture folder to generate a corresponding similarity score for each of the remaining images; d) determining (326) whether any of the corresponding similarity scores are at least equal to a predetermined score threshold, and removing each image having a corresponding similarity score at least equal to the predetermined score threshold from the capture folder to a delete folder (330); and e) determining (334) whether there is at least one image in the capture folder and if so repeating steps b) through d).

27 Claims, 8 Drawing Sheets

METHOD AND APPARATUS FOR ENROLLMENT AND AUTHENTICATION OF BIOMETRIC IMAGES

FIELD OF THE INVENTION

The present invention relates generally to biometric identification systems and more specifically to a method and apparatus for enrolling biometric images for a user and for later verification of the user based on the enrolled images.

BACKGROUND OF THE INVENTION

Biometric image-based identification systems have played a critical role in modern society in both criminal and civil applications. For example, criminal identification in public safety sectors is an integral part of any present day investigation. Similarly in civil applications such as credit card or personal identity fraud, print identification, for instance, has become an essential part of the security process. Among all of the biometrics (face, fingerprint, iris, etc.), iris and retina are the preferred biometric indicators for high security applications. However, verification systems based on fingerprints are very popular both for historical reasons and for their proven performance in the field, and facial image matching is the second largest biometric indicator used for identification.

An automatic biometric image-based identification operation, e.g., for enabling fingerprint, palm print, or facial image identification, typically consists of two stages. The first is the registration or enrollment stage, and the second is the identification, authentication or verification stage. In the enrollment stage, an enrollee's personal information and biometric image (e.g., fingerprint, palm print, facial image, etc.) is enrolled in the system. The biometric image may be captured using an appropriate sensor, and features of the biometric image such as, for instance, minutiae in the case of fingerprints, are generally extracted. The personal information and extracted features, and perhaps the image, are then typically used to form a file record that is saved into a database for use in subsequent identification of the enrollee.

In the identification/verification stage, a biometric image may be captured from an individual or a latent print may be obtained. Features are generally extracted from the image and, along with personal information, are formed into what is typically referred to as a search record. The search record is then compared with the enrolled (i.e., file) records in the database of the identification system. A list of matched scores is typically generated as a result of this matching process, and candidate records are sorted according to matched scores. A matched score is a measurement of the similarity of the features of the identified search and file records. Typically, the higher the score is, the more similar the file and search record is determined to be. Thus, a top candidate is the one that has the closest match.

With the advances in sensor technology in recent years, sensors used in capturing biometric images in both the enrollment and identification/verification stages have become much more compact. This decrease in size has also translated into a decrease in cost for manufacturing the sensors. For instance, some manufactures are now able to place a small non-optical fingerprint sensor, i.e. a solid state sensor, on a handheld wireless device such as a cellular telephone. In this instance, the capturing area of such a sensor is normally smaller than the size of the total area of the finger that needs to be captured, which may lead to difficulties in recognizing fingerprints acquired through these small-area sensors. An exemplary capture area for a solid state fingerprint sensor is only 300×300 pixels. Whereas, the area of the finger being captured may be on average three times as large.

The limitations with respect to fingerprint identification while using these small sensors result from the possibility that two impressions taken at different times from the same finger (e.g. during the enrollment stage and during the verification stage) may have a very small amount of fingerprint overlap area. Specifically, in the enrollment stage, typically only one file print image is enrolled (which is representative of only a portion of the actual finger print being captured), and features from this image are extracted and saved to be compared to a subsequent search print. If a minutiae-based matching algorithm is used, in the case of small overlap between the search and file prints, the number of mated minutiae will, likewise, be limited, which causes a loss in matching accuracy. The loss in accuracy may lead to an unauthorized person being misidentified as an authorized user, or an authorized person being prevented from using the application. In either case, the user is subject to significant inconvenience at best. Palm print identification using a sensor having an area smaller than the area of the palm that needs to be captured suffers from similar limitations as those described above with respect to fingerprint identification.

There are several known possible solutions to the above small sensor identification problem. However, each of these solutions has its own limitations. For instance, the size of the sensor may be increased, but this would typically lead to a more expensive sensor, thereby increasing the cost of the product that houses the sensor. Moreover, this may not be possible for some applications because of the small size of the product. Another solution is to use an image display to provide visual guidance while the user's images are being enrolled. However, it may not be practical in some applications to house such a display on the device due to size constraints, for instance, of the device. Still, another solution is to ask the user to put his finger in different positions while capturing his fingerprint during the verification stage. This solution is much more time consuming to the user during the verification process and, accordingly, may not be practical in real-world applications.

Yet another solution to the above small sensor identification problem is illustrated by reference to the flow diagram of FIG. 2. In this case, instead of a single print image being captured and stored as part of a file record for the enrollee, a mosaic fingerprint image is created and formed into a file record. To accomplish this, a fingerprint image is captured using a sensor (210) until it is determined (214) that the image is greater than a predetermined quality threshold. If the quality threshold is exceeded for the image, the image is enrolled as a file image (216). It is then determined (236) whether the number of enrolled images equals a desired, i.e., predetermined, number of enrolled images. If not, then steps 210 through 216 are repeated until the number of desired enrolled images is reached. A mosaic image is then created (240) from all of the enrolled images. The features of this mosaic image are extracted (220) and the mosaic image and corresponding matching features stored as the file record (224).

This method cannot be easily applied in real world applications due to several problems associated with the method. For instance, the mosaic image assembly process itself is a matching process, which requires linking the ridges to corresponding ridges and valleys to corresponding valleys, of the plurality of captured images, without any error. However, due to image distortion and noise and other uncertainties in image capture, this is typically not achievable. Correspondingly, the mosaic image created will generally not have smooth transitions in the boundaries between the separate captured images. Such limitations with respect to the generation of the mosaic image will lead to falsely detected minutiae during the verification stage, which leads to a lower matching accuracy.

As stated above, facial image matching is the second largest biometric used for identification. It has been implemented, for instance, in video-surveillance identification, entrance control, and retrieval of an identity from a database for criminal investigations. A benefit of this type of identification is that the acquisition process is non-intrusive and does not require collaboration of the person. However, a limitation is that, in general, the facial image expression or the captured angle of view may be different from the enrolled image or images, which causes a loss in matching accuracy. Capturing a plurality of different images from different angles of the face and with different facial expressions, during the enrollment stage, may solve the accuracy issue. However, there is a practical limit on the number of facial images that may be captured due to storage limitations of the system and due to a desire to keep the match time associated with the additional enrolled images to an acceptable level.

Thus, there exists a need for a method and apparatus for determining and storing an acceptable number of biometric images, such as fingerprints, facial images and palm print images, for use in biometric authentication when the identification system includes a sensor having an area that is smaller than the area of the biometric being captured. It is further desirable that the method increase the chances of a correct identification and decrease the chances of a misidentification during the verification process.

BRIEF DESCRIPTION OF THE FIGURES

A preferred embodiment of the invention is now described, by way of example only, with reference to the accompanying figures in which.

DETAILED DESCRIPTION OF THE INVENTION

Figure 1:
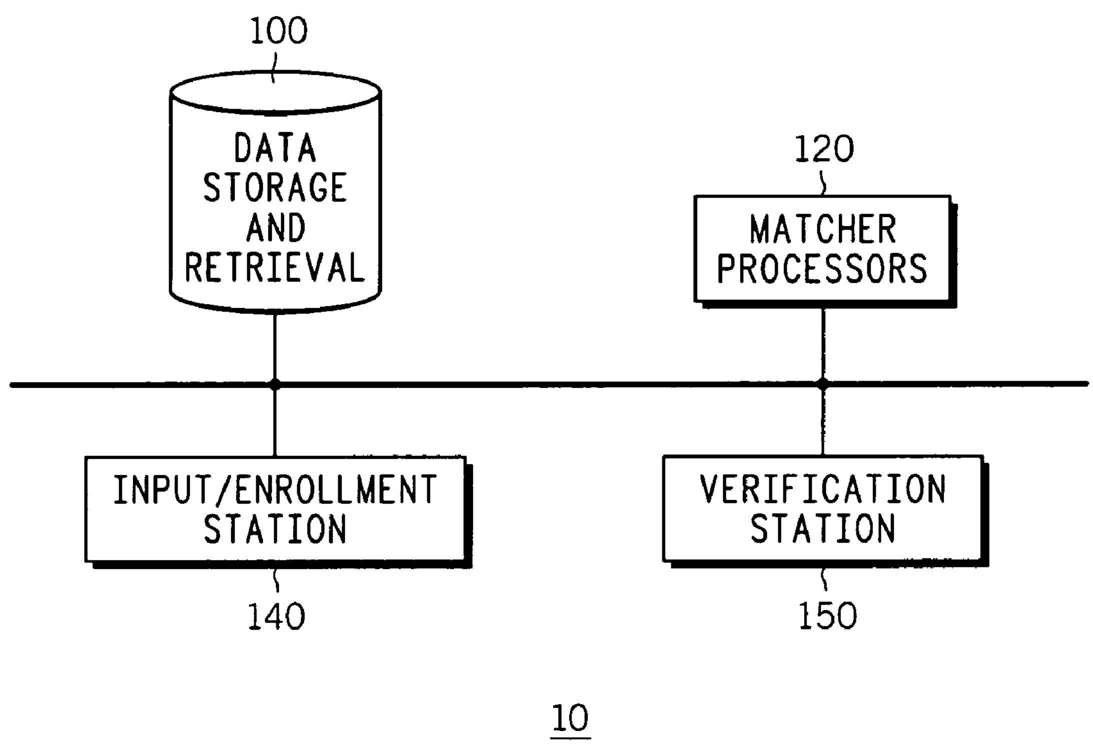
FIG. 1 illustrates a simple block diagram of a biometric identification system in accordance with an embodiment of the present invention.
Figure 2:
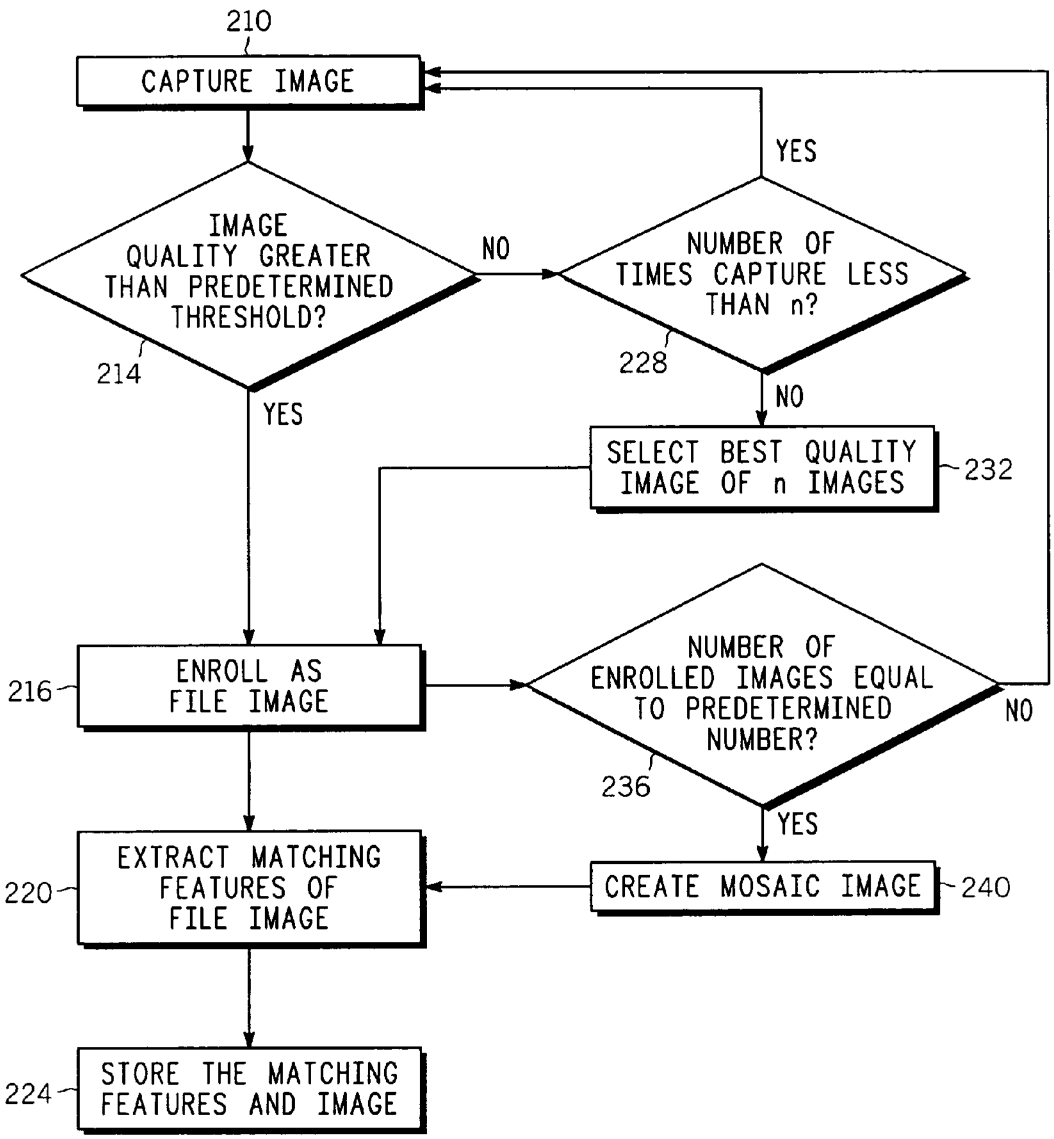
FIG. 2 illustrates a flow diagram of a prior art method for fingerprint enrollment.

While this invention is susceptible of embodiments in many different forms, there are shown in the figures and will herein be described in detail specific embodiments, with the understanding that the present disclosure is to be considered as an example of the principles of the invention and not intended to limit the invention to the specific embodiments shown and described. Further, the terms and words used herein are not to be considered limiting, but rather merely descriptive. It will also be appreciated that for simplicity and clarity of illustration, elements shown in the figures have not necessarily been drawn to scale. For example, the dimensions of some of the elements are exaggerated relative to each other. Further, where considered appropriate, reference numerals have been repeated among the figures to indicate corresponding elements.

FIG. 1 illustrates a-simple block diagram of a biometric identification system 10 in accordance with an embodiment of the present invention. System 10 may be included, for instance, in a fingerprint identification system that may be incorporated into a cellular telephone as discussed above or that may be incorporated into other applications used for biometric identification such as palm print identification and facial image identification systems. System 10 ideally includes an input and enrollment station 140, a data storage and retrieval device 100, one or more matcher processors 120 and a verification station 150.

Input and enrollment station 140 is used to capture a biometric image such as a fingerprint and to optionally extract the relevant matching features of that image for later comparison. File records may also be generated in the input and enrollment station 140 from the captured images and extracted features. Input and enrollment station 140 may also be configured to perform enrollment functions discussed below in accordance with an embodiment of the present invention. Thus, input and enrollment station 140 may be coupled to a sensor in accordance with an above-discussed small sensor for capturing images, wherein the sensor area is smaller than the total area that is to be captured. The sensor may be, for instance, an optical sensor or a solid-state sensor. The input and enrollment station 140 is further coupled to or incorporates a processor device for performing its remaining functions.

Data storage and retrieval unit 100 stores and retrieves the file records, including the matching features, and may also store and retrieve other data useful to carry out the present invention. Matcher processors 120 may use the extracted matching features of the biometric images to determine similarity or may be configured to make comparisons at the image level. One such matcher processor may be a conventional minutiae matcher for comparing the extracted minutiae of two fingerprint images or palm print image. In the case of facial image matching, the matcher process may consist of principal component analysis matching, eigenface matching, local feature analysis matching, or other matching algorithms.

Finally, verification station 150 is used to verify matching results using a method in accordance with an embodiment of the present invention. Accordingly, verification station 150 is used to capture a biometric image such as a fingerprint and to optionally extract the relevant matching features of that image for comparison with matching features in one or more file records. Search records may also be generated in the verification station 150 from the captured images and extracted features. Thus, verification station 150 may also be coupled to the sensor for capturing search images and coupled to or having incorporated within a processor device for performing its remaining functions.

It is appreciated by those of ordinary skill in the art that although input and enrollment station 140 and verification station 150 are shown as separate boxes in system 10, these two stations may be combined into one station in an alternative embodiment. Moreover, where system 10 is used to compare one search record for a given person to a plurality of file records for different persons, system 10 may optionally include a distributed matcher controller (not shown), which may include a processor configured to more efficiently coordinate the more complicated or time consuming matching processes.

Figure 3:
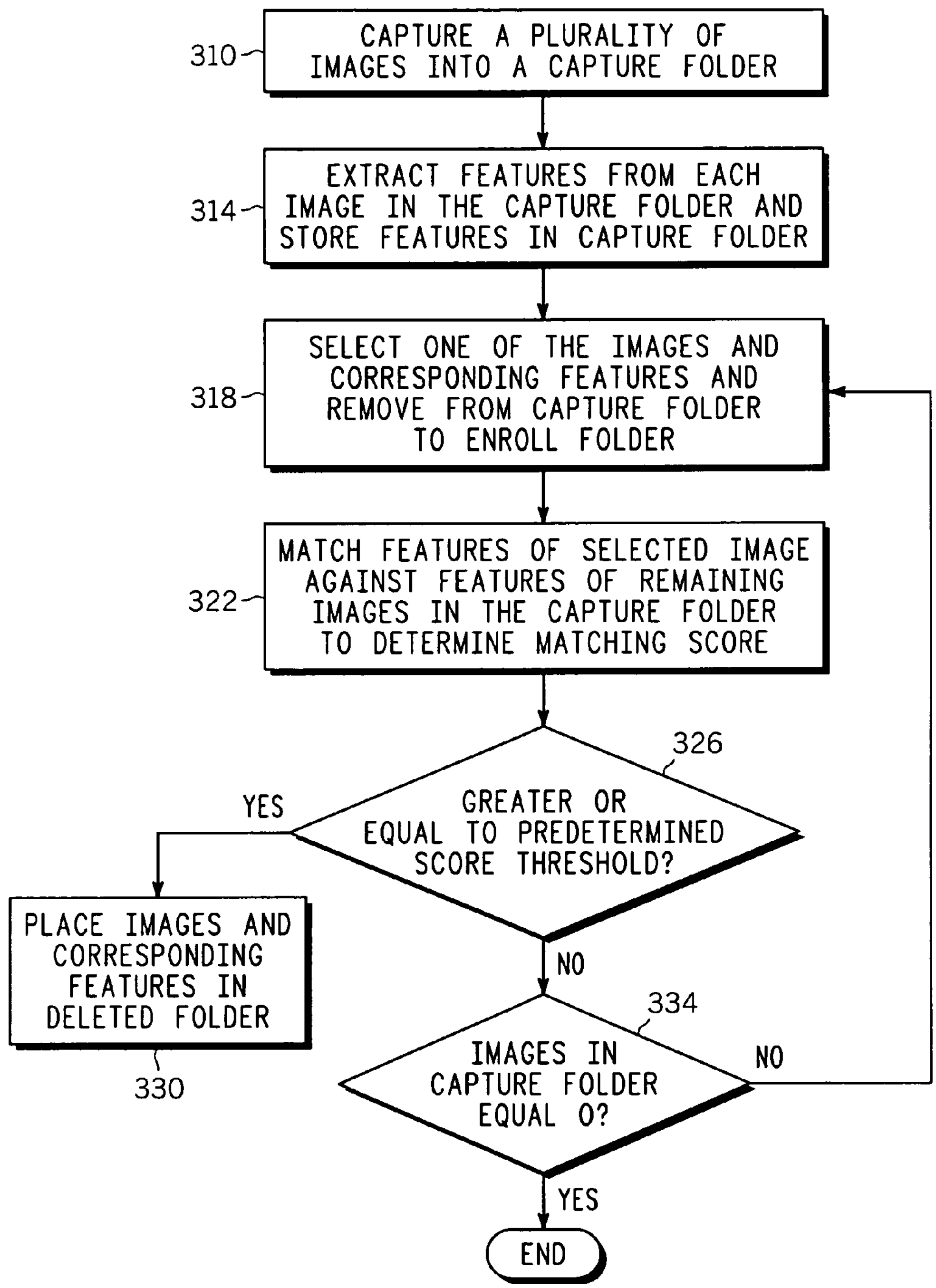
FIG. 3 illustrates a flow diagram of a method for biometric image enrollment in accordance with an embodiment of the present invention.

FIG. 3 illustrates a flow diagram of a method for biometric image enrollment in accordance with an embodiment of the present invention. This method may be implemented in one or more processors in system 10 and enables a set of images (and corresponding features) to be captured from an enrollee to facilitate efficient and accurate identification of the enrollee at some subsequent time. The method will be described in terms of fingerprint identification for ease of illustration. However, it is appreciated that the method may be similarly implemented for other types of biometric image enrollment such as, for instance, palm print or facial image enrollment.

In accordance with the method illustrated in FIG. 3, a plurality of fingerprint images are captured and enrolled (310) by placing the enrollee's finger on the sensor and moving it around into different positions on the sensor. The sensor continuously captures snapshot images of the fingerprint while the finger is touching the sensor. Typically, the captured images will represent many different overlapping parts of the fingerprint. Let's assume N images are enrolled and stored in a capture folder (310), wherein N may be pre-determined, for instance, as a function of balancing storage requirements (i.e., less storage needed with smaller Ns) with the degree of accuracy desired for the system 10 (i.e., greater accuracy enabled by larger Ns). In a similar manner, a plurality of palm print images or facial images may be captured into a capture folder. As explained above, images from different angles of the face as well as different facial expressions may be captured. This capture folder may be stored in a storage device coupled to the input and enrollment station 140 such as, for instance, the data storage and retrieval device 100.

The features of these N images that are used for matching, e.g., minutiae in the case of fingerprints, are then typically but not required to be extracted and also stored in the capture folder (314). Where images are compared at the image level as opposed to the feature level, feature extraction is, thereby, unnecessary. Thereafter, one print image from the total print images in the capture folder is selected as a search print image and stored into an enroll folder, for instance in data storage and retrieval unit 100, and the rest of the print images remain in the capture folder as a set of background file print images (318). The features of the search print image are then compared to the features of each of the remaining background file print images using the matcher processors 120 (e.g., a minutiae matcher) to generate matching scores (also referred to herein as similarity scores) for each comparison (322).

Those background file print images that have a corresponding matching score determined (326) to be greater than or equal to a pre-determined threshold, Te, are removed along with their corresponding matching features from the capture folder and stored in a temporary delete-folder (330), for instance in data storage and retrieval unit 100. If it is determined (334) that all of the print images have been removed from the capture folder, i.e., either to the temporary delete folder or to the enroll folder, then the method of FIG. 3 ends. The enroll folder is complete, and the images stored in the enroll folder will be subsequently used for comparison to a search print during the verification stage. Otherwise, the method returns to step 318, wherein another of the images in the capture folder is selected and placed, along with its matching features, in the enroll folder.

As can be seen in FIG. 3, threshold Te controls the number of print images stored in the enroll folder. Accordingly, the purpose of step 326 is to eliminate from the enroll folder, as a function of Te, those images having too great a similarity to the image selected as the search image. This is done to decrease the incidence of redundancy of the images in the enroll folder, thereby decreasing storage requirements for the enroll folder. The value of Te is primarily a function of at least one characteristic of the matcher used, as will be shown by reference to FIG. 6. However, the size of the sensor in relation to the size of the image being captured also effects the value of Te since the scale of the matched scores are different.

Figure 6:
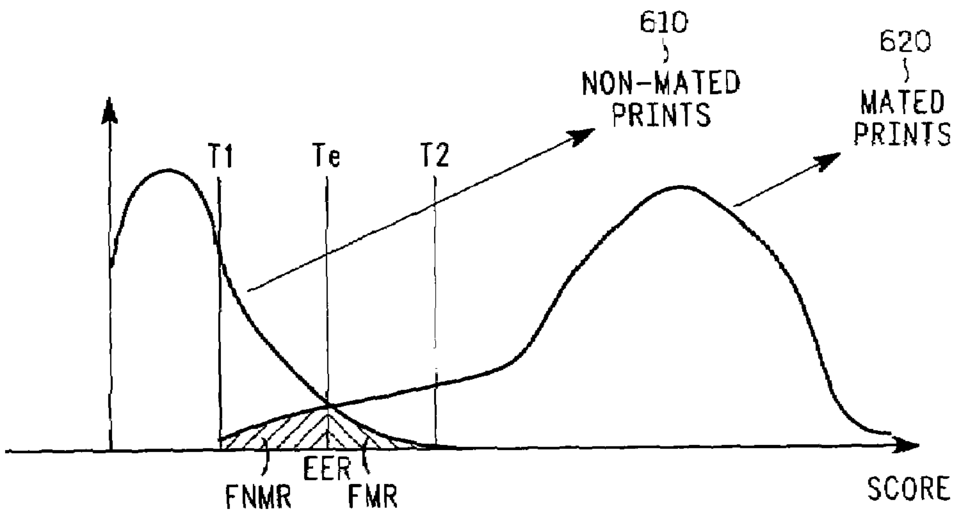
FIG. 6 illustrates distribution curves for matching print scores and non-matching print scores for determining thresholds used to control fingerprint enrollment and verification in accordance with an embodiment of the present invention.

To evaluate the accuracy of a biometric matcher such as, for instance, a fingerprint matcher, one must collect scores generated from a number of fingerprint pairs from the same finger (i.e., distribution curve 620 for mated prints) and scores generated from a number of fingerprint pairs from different fingers (i.e., distribution curve 610 for non-mated prints). In typical commercial applications, the value for Te is selected as the point where the matching score and non-matching score distribution curves cross, or the statistical equal error rate (EER) point, as depicted in FIG. 6. At this threshold value, the false match rate (FMR) is equal to the false non-match rate (FNMR). The FMR is the probability that the system determined that a person was who he claimed to be, when the input came from a different person. The FNMR is the probability that the system determined that a person was not who he claimed to be, when the input came from the same person.

Threshold Te may also be selected to have a value that is greater than or less than the EER depending upon the design criterion of storage requirements or the number of prints desired in the final enrolled list. If the design criterion dictates smaller storage requirements, i.e., fewer prints in the final enrolled record, then a lower Te threshold should be selected. Conversely, if the design criterion dictates larger storage requirements, i.e., more prints in the final enrolled record, then a larger Te threshold should be selected. Moreover, as FIG. 6 indicates, a minimum threshold Ti is the point of zero FNMR and a maximum threshold T2 is the point of zero FMR. Accordingly, if Te is selected outside of the T1 and T2 boundaries, it will increase one type of error without decreasing the other type of error or vice versa, which would be undesirable. Thus, Te should ideally be set between T1 and T2. The thresholds T1, T2 and Te illustrated in FIG. 6 were explained by reference to fingerprint identification. However, it should be readily appreciated by those of ordinary skill in the art that these thresholds may be similarly determined for matchers used, for instance, in matching palm prints and facial images.

Figure 4:
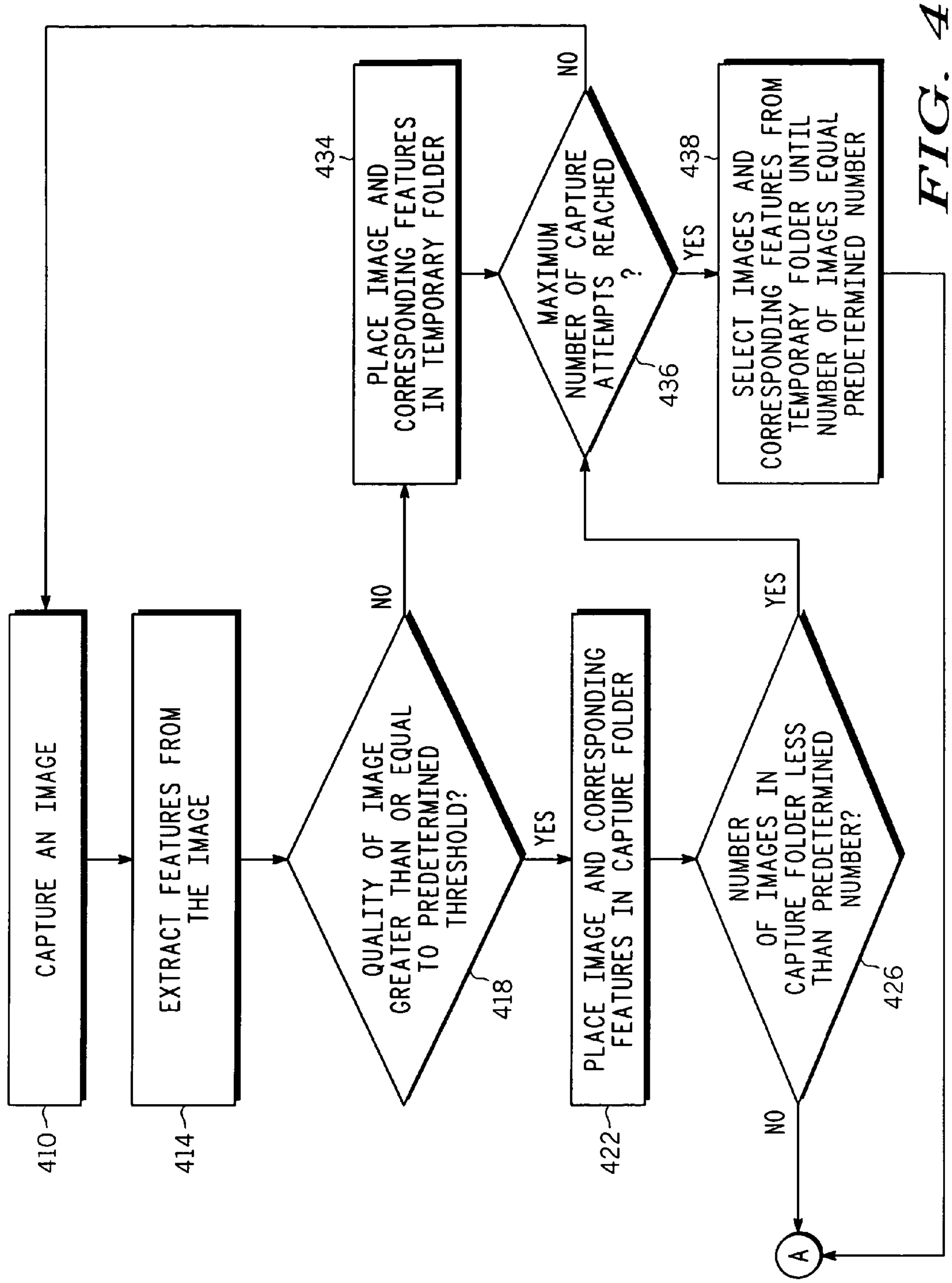
FIG. 4 illustrates a flow diagram of a method for biometric image enrollment in accordance with an embodiment of the present invention.
Figure 5:
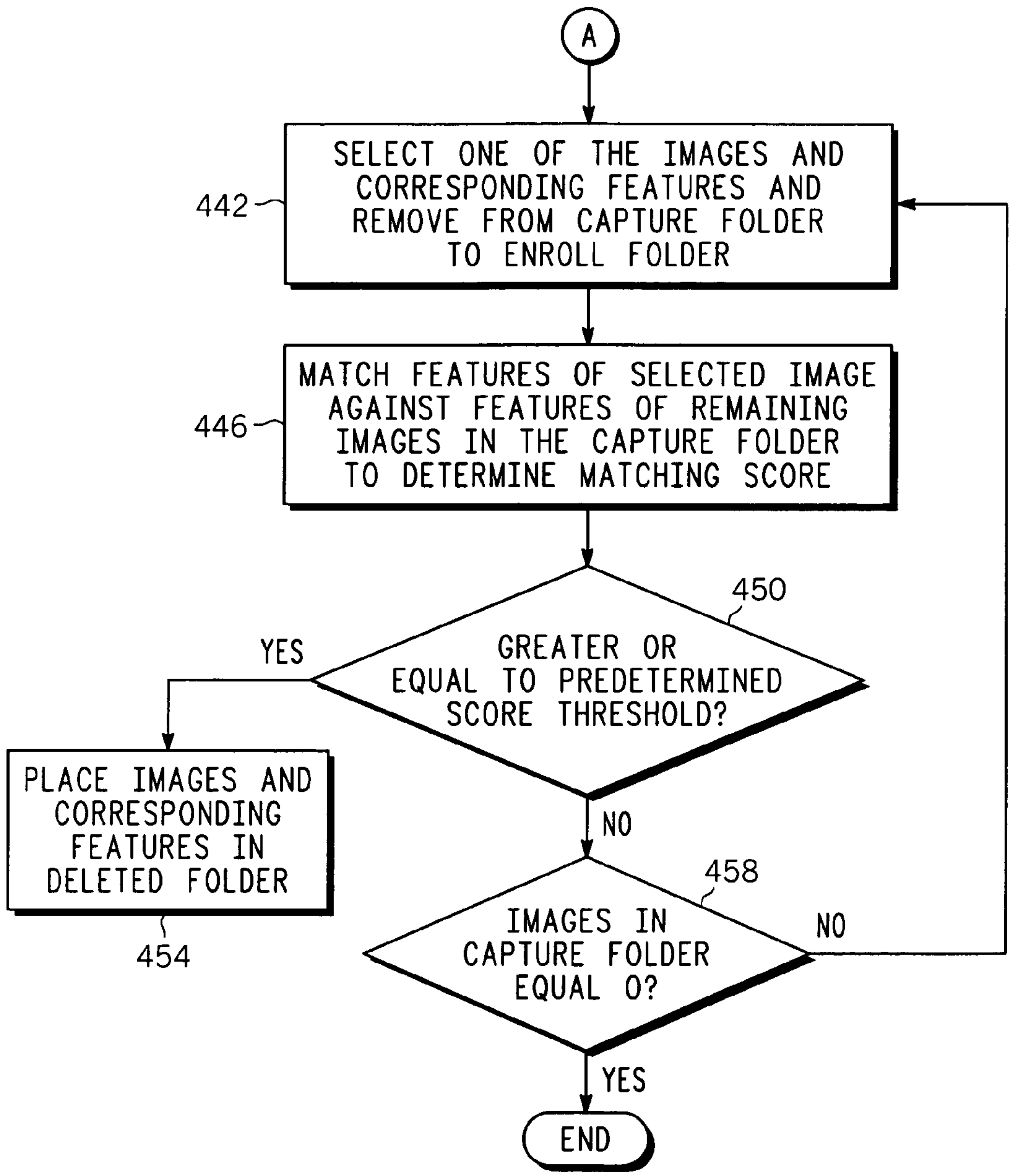
FIG. 5 illustrates a flow diagram of a method for biometric image enrollment in accordance with an embodiment of the present invention.

FIGS. 4 and 5 illustrate a flow diagram of a method for biometric image enrollment in accordance with an embodiment of the present invention. Similar to the method in FIG. 3, this method will be described in terms of fingerprint identification for ease of illustration. However, it is appreciated that the method may be similarly implemented for other types of biometric image enrollment such as, for instance, palm print or facial image enrollment. In this embodiment, ideally only images having a certain quality are captured and stored in the capture folder during the enrollment stage.

In accordance with the enrollment method of FIG. 4, a finger print image of an area of a finger is captured (410) using the sensor, and matching features are optionally extracted (414). Typically, there is a maximum limit placed on the number of images that are captured from the enrollee, irrespective of the quality, so as not to unduly inconvenience the enrollee. However, this requirement is not necessary. It is then determined (418) whether the quality of the captured images is greater than or equal to a predetermined quality threshold. If it is, then the image and its corresponding matching features are stored in the enroll folder (422), and if not the image and its corresponding matching features are stored in a temporary folder (434).

With respect to the capture of fingerprint images, the quality threshold used in step 418 to select images for the capture folder is empirically determined based on the valid ridge flow direction distribution between rejected prints (i.e., poor quality prints) and accepted prints (i.e., reasonable good quality prints) from an off-line database during the design of the identification system 10. For palm print identification system, the quality threshold is determined in a similar fashion as in a fingerprint identification system. In the case of facial matching, the quality threshold may be relaxed to allow every captured image to be enrolled into the system and let the enrollment process select the final enroll images.

Each time an image is stored in the capture folder, it is determined (426) whether the capture folder contains the number of images desired, e.g., a pre-determined number of images. If it does, then the capture folder is complete and steps 442 through 458 of FIG. 5 are performed for building the enroll folder from the images in the capture folder. Steps 442 through 458 of FIG. 5 are identical to steps 318 through 334 of FIG. 3. Therefore, for the sake of brevity a detailed description of steps 442 through 458 will not be repeated. However, if the capture folder does not contain the number of images desired, then it is further determined (436) whether the maximum number of capture attempts has been reached. If this maximum number has been reached, then images and their corresponding matching features are selected from the temporary folder and stored in the capture folder until the desired number of images in the capture folder has been reached (438). Thereafter, steps 442 through 458 are performed for building the enroll folder from the images in the capture folder. Alternatively, if the maximum number of capture attempts has not been reached, then the process returns to step 410, wherein another image of the finger, ideally a different area of the finger, is captured.

Each time an image is stored in the temporary folder, it is determined (436) whether the maximum number of capture attempts has been reached. If this maximum number has been reached, then images and their corresponding matching features are selected from the temporary folder and stored in the capture folder until the desired number of images in the capture folder has been reached (438). Thereafter, steps 442 through 458 are performed for building the enroll folder from the images in the capture folder. Alternatively, if the maximum number of capture attempts has not been reached, then the process returns to step 410, wherein another image of the finger, ideally a different area of the finger, is captured.

Figure 7:
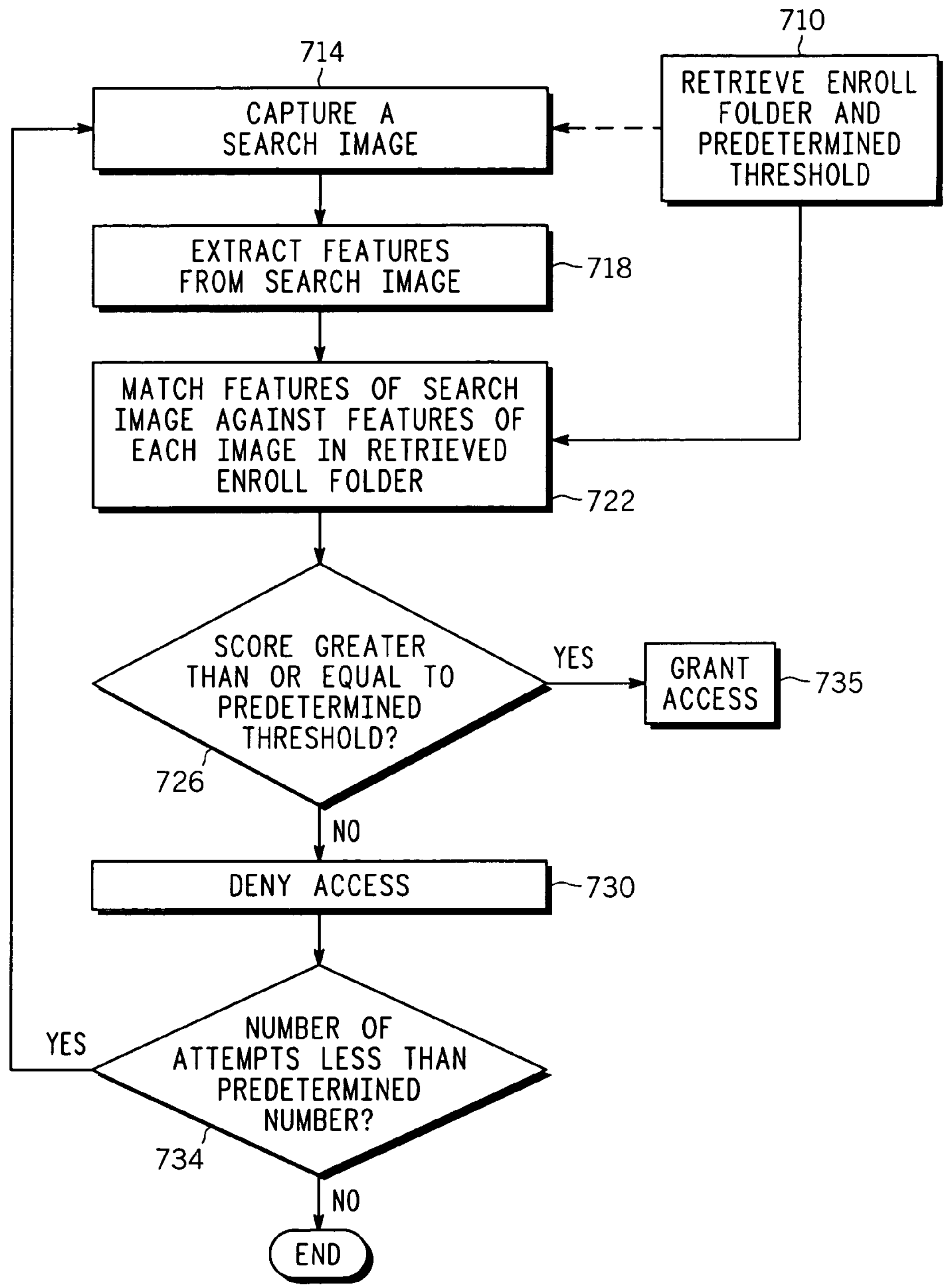
FIG. 7 illustrates a flow diagram of a method for biometric image verification in accordance with an embodiment of the present invention.

FIG. 7 illustrates a flow diagram of a method for biometric image verification in accordance with an embodiment of the present invention, which may be performed in the verification station 150 (FIG. 1) and may be implemented using one or more processors in system 10. Moreover, this method may be used for various types of biometric authentication, including fingerprint, palm print and facial image authentication. To verify a user, for instance to grant access to a system, her enroll folder must be retrieved along with her corresponding predetermined verification threshold (710). In a system storing enroll folders for a plurality of users, the retrieval of this information may be triggered by inputting the user's personal information into the system, e.g., their name or some type of appropriate identification number. However, in a system that has a single user to be verified, e.g., a cellular telephone, simply capturing a search image on the sensor (714) could trigger the retrieval of the appropriate enroll folder.

Once a search image is captured, features are extracted from the search image (718), if a comparison is being made at the feature level. The features of the search image are then matched against the features of each of the images in the enroll folder and corresponding matching scores are generated (722). If it is determined (726) that any of the matching scores is greater than or equal to the verification threshold then access is granted (735). If it is determined (726) that all of the matching scores are less than the verification threshold then access is denied (730). Optionally, upon determining (734) that the number of verification attempts is less than the maximum number allowed, i.e., less than some predetermined number of attempts, the process is repeated by capturing another search image (714). Otherwise if the maximum number of attempts has been reached, then the process is ended, and access by the user to the system is denied. Having a plurality of attempts helps to enable the capture of at least one search image of sufficient quality to enable user verification. Controlling the number of attempts to a maximum number assists in minimizing any inconvenience to the user during the verification stage.

Figure 8:
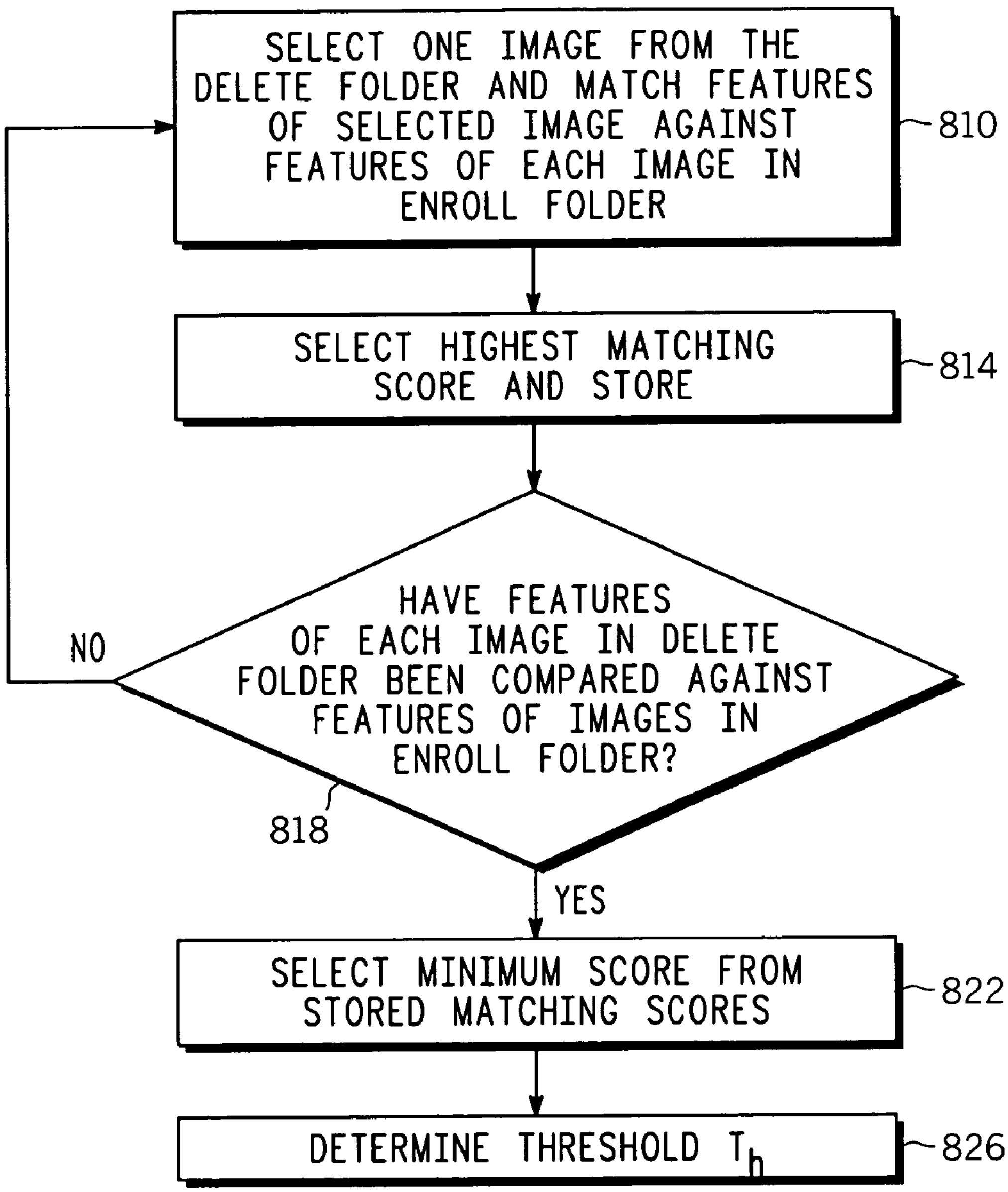
FIG. 8 illustrates a flow diagram of a method for determining the threshold used in the verification method illustrated in FIG. 7.

One advantage of the present invention is that in a multi-user system, a single verification threshold is not used for all users. In the present invention, a verification threshold is individually determined for each user. FIG. 8 illustrates a flow diagram of a method for determining a given user's verification threshold used in determining whether the user will be granted access to a system. The delete folder generated for that user in the enrollment method illustrated in FIG. 3 (and FIG. 5) is utilized for the present embodiment.

One image from the delete folder is selected and matched against each of the M number of final enrolled images in the user's enroll folder. Matching is typically done by comparing the matching features of the selected image from the delete folder to the matching features of each of the images of the enroll folder, for instance, using the matcher processors 120 (e.g., a minutiae matcher), to generate M match scores (810). Of these M match scores, the highest score, Si, is selected (814). Selection of the highest Si score facilitates a minimum matching score corresponding to a deleted image so that search images that are not those of the user will not pass the verification threshold even though the image may have some similarity to that of the user's biometric images. Steps 810 and 814 are repeated until it is determined (818) that the features of each image in the delete folder have been compared with the features of each image in the enroll folder, thereby generating N-M Si highest match scores. The lowest score of the total number N-M Si scores is selected (822), which helps to ensure that a search image matching any of the deleted images will pass the verification threshold. The verification threshold Th may then be set to this selected lowest Si match score (826).

Alternatively, the verification threshold Th may be determined (826) in accordance with the following algorithm. If the lowest Si match score is greater than a first pre-defined minimum threshold T1 and less than a second pre-defined maximum threshold T2, the lowest Si match score will be used as the verification threshold Th. If the lowest Si match score is smaller than T1, then Th is set to T1. In all other cases, Th is set to T2. Such an algorithm helps to ensure that the verification threshold Th is not out of bounds based upon the matcher and its corresponding relevant database of mated and non-mated images (e.g., distribution curves 620 and 610, respectively, of FIG. 6).

In the case where fingerprints are being matched, the T1 and T2 thresholds are pre-calculated based on the statistical distribution of the matching print scores and the non-matching print scores for the matcher used. Specifically, T1 and T2 are selected as shown in FIG. 6, wherein T1 is the point of zero FNMR, and T2 is the point of zero FMR. The calculated verification threshold Th may be stored, for instance, under the corresponding person's ID and will be used to determine whether a match is found or not in the verification stage. Moreover, as stated earlier, thresholds Th, T1 and T2 are determined in a similar fashion in the application of other biometric identification systems such as, for instance, palm print identification and facial image identification systems.

Referring again to the verification process illustrated in the flow diagram of FIG. 7, further processing may be performed on images for which access was denied. For instance, those images upon which access was denied and their corresponding matching features may be stored in a search record and compared against file records in a criminal database to determine, for instance, whether identity theft has taken place or whether the owner of the image may be linked to a criminal investigation. In addition, if one or more of the images denied access is known to be a match for a user, the image(s) may be added to the enroll folder for the user and a new verification threshold calculated based upon these added images.

The present invention of biometric image enrollment and verification realizes several advantages over the prior art. Certain of these advantages are listed as follows but should not be considered to be the only advantages and should also not be considered as limiting the invention in any way. For instance, in the present invention, a plurality of images are enrolled in the enrollment stage, instead of a single image or a mosaic image, to enhance the subsequent matching accuracy during the verification stage. Moreover, the present invention provides a systematic way to determine the number of image sets or feature sets that should be enrolled to achieve optimal accuracy and speed for a biometric authentication system, while keeping the storage requirements to a minimum.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

What is claimed is:

1. A method for enrolling biometric images comprising the steps of:

a) capturing a plurality of images for a user into a capture folder;

b) selecting one of the plurality of images in said capture folder and removing said selected image from the capture folder to an enroll folder;

c) comparing the selected image to each of the remaining images in the capture folder to generate a corresponding similarity score for each of the remaining images;

d) determining whether any of the corresponding similarity scores are at least equal to a predetermined score threshold, and removing each said image having a corresponding similarity score at least equal to the predetermined score threshold from the capture folder to a delete folder; and e) determining whether there is at least one remaining image in the capture folder and if so selecting one of the remaining images and removing it to the enroll folder and repeating steps c) and d), wherein the enroll folder comprises at least two images that are dissimilar based on the predetermined score threshold, and the images in the enroll folder are used during a verification process.

2. The method of claim 1 further comprising the step of extracting corresponding matching features from each of the images in said capture folder and storing said corresponding matching features in said capture folder with said images.

3. The method of claim 2, wherein said selected image is compared to the remaining images in said capture folder by comparing the matching features of said selected image to the matching features of each of the remaining images in said capture folder.

4. The method of claim 3, wherein said matching features are minutiae, and the corresponding minutiae of said selected image are compared with the corresponding minutiae of each of the remaining images in said capture folder using a minutiae matcher processor.

5. The method of claim 2, wherein each of the images in said enroll folder is stored with its corresponding matching features, and each of the images in said delete folder is stored with its corresponding matching features.

6. The method of claim 1, wherein the selected image is compared with each of the remaining images in said capture folder using a matcher processor.

7. The method of claim 6, wherein said score threshold is a function of at least one characteristic of said matcher processor.

8. The method of claim 7, wherein said score threshold is selected to be at least equal to a minimum threshold for said matcher processor and no greater than a maximum threshold for said matcher processor.

9. The method of claim 8, wherein said minimum threshold is the point of zero false non match rate (FNMR) on a distribution curve for mated images, and said maximum threshold is the point of zero false match rate (FMR) on a distribution curve for non-mated images.

10. The method of claim 9, wherein said score threshold is an equal error rate point between said point of zero FMR and said point of zero FNMR.

11. The method of claim 1, wherein said plurality of images are captured in said capture folder as a function of a predetermined quality threshold.

12. The method of claim 11, wherein said quality threshold is determined based on valid ridge flow direction distribution between rejected prints and accepted prints in a fingerprint identification system.

13. The method of claim 11, wherein said step of capturing said plurality of images into a capture folder comprises the steps of:

i) capturing an image;

ii) determining whether the quality of said captured image is at least equal to said predetermined quality threshold; and iii) enrolling the captured image in said capture folder its quality is at least equal to said predetermined quality threshold.

14. The method of claim 13, wherein a predetermined number of images are captured into said capture folder.

15. The method of claim 14, wherein steps i) through iii) are repeated until said capture folder includes said predetermined number of images.

16. The method of claim 14, wherein said step of capturing said plurality of images into a capture folder further comprises the steps of:

iv) placing the captured image into a temporary folder if its quality is less than said predetermined quality threshold; and v) determining whether a predetermined maximum number of capture attempts has been reached and whether said capture folder includes said predetermined number of images, and returning to step i) if the capture folder does not include said predetermined number of images and said predetermined maximum number of capture attempts has not been reached; and selecting images from said temporary folder and placing them into said capture folder until said capture folder includes said predetermined number of images if said predetermined maximum number of capture attempts has been reached.

17. The method of claim 1, wherein said method is used for enrolling at least one of the set of: fingerprint images, palm print images and facial images.

18. A method for determining a verification threshold for a user based on comparing one or more images in a delete folder with a plurality of images in an enroll folder, said delete and enroll folders generated as in claim 1, said method comprising the steps of:

a) selecting one image from said delete folder;

b) comparing said selected image with each image in said enroll folder and generating a corresponding similarity score for each said comparison;

c) selecting the highest similarity score from said corresponding similarity scores;

d) repeating steps a), b) and c) until each image in said delete folder has been compared with each image in said enroll folder;

e) selecting the minimum score of all of the highest similarity scores selected in step c); and f) determining said user verification threshold as a function of said minimum score, the user verification threshold for comparing an image of the user to the images in the enroll folder during a verification process.

19. The method of claim 18, wherein said user verification threshold is equal to said minimum score.

20. The method of claim 18 further comprising the step of granting or denying the user access to a system based on the user's verification threshold.

21. The method of claim 18, wherein the selected image is compared with each of the images in said enroll folder using a matcher processor.

22. The method of claim 21, wherein said user verification threshold is further a function of at least one characteristic of said matcher processor.

23. The method of claim 22, wherein said user verification threshold is selected to be at least equal to a minimum threshold for said matcher processor and no greater than a maximum threshold for said matcher processor.

24. The method of claim 23, wherein said user verification threshold is determined in accordance with an algorithm such that:

said user verification threshold is selected to be said minimum threshold if said minimum score is less than said minimum threshold;

said user verification threshold is selected to be said minimum score if said minimum score is between said minimum threshold and said maximum threshold; and said user verification threshold is selected to be said maximum threshold if said minimum score is greater than said maximum threshold.

25. A method for enrolling biometric images comprising the steps of:

a) capturing a plurality of images for a user into a capture folder;

b) extracting corresponding matching features from each of the images in said capture folder and storing said corresponding matching features in said capture folder with said images;

c) selecting one of the plurality of images in said capture folder and removing said selected image and its corresponding matching features from the capture folder to an enroll folder;

d) comparing the matching features of the selected image to the matching features of each of the remaining images in the capture folder to generate a corresponding similarity score for each of the remaining images;

e) determining whether any of the corresponding similarity scores are at least equal to a predetermined score threshold and removing each said image, and its corresponding matching features, having a corresponding similarity score at least equal to the predetermined score threshold from the capture folder to a delete folder; and f) determining whether there is at least one remaining image in the capture folder and if so selecting one of the remaining images and removing it to the enroll folder and repeating steps c) and d), wherein the enroll folder comprises at least two images that are dissimilar based on the predetermined score threshold, and the images in the enroll folder are used during a verification process.

26. A system for biometric image enrollment and verification comprising:

a) means for capturing a plurality of images for a user into a capture folder;

b) means for selecting one of the plurality of images in said capture folder and removing said selected image from the capture folder to an enroll folder;

c) means for comparing the selected image to each of the remaining images in the capture folder to generate a corresponding similarity score for each of the remaining images;

d) means for determining whether any of the corresponding similarity scores are at least equal to a predetermined score threshold, and removing each said image having a corresponding similarity score at least equal to the predetermined score threshold from the capture folder to a delete folder;

e) means for determining whether there is at least one remaining image in the capture folder and if so selecting one of the remaining images and removing it to the enroll folder and repeating steps c) and d), wherein the enroll folder comprises at least two images that are dissimilar based on the predetermined score threshold, and the images in the enroll folder are used during a verification process f) means for determining a verification threshold for said user based on comparing each image in said delete folder with each image in said enroll folder;

g) means for capturing at least one image from said user for use as a search image;

h) means for comparing said at least one search image to each image in said enroll folder and generating corresponding similarity scores for each of the images in the enroll folder; and i) means for determining whether at least one corresponding similarity score generated in step h) is at least equal to said user verification threshold and if so granting the user access to a system.

27. The system of claim 26, wherein said system is used for enrollment and verification for at least one of the set of: fingerprint images, palm print images and facial images.

* * * * *

UNITED STATES PATENT AND TRADEMARK OFFICE

CERTIFICATE OF CORRECTION

PATENT NO. : 6,993,166 B2 Page 1 of 1
APPLICATION NO. : 10/838617
DATED : January 31, 2006
INVENTOR(S) : Lo et al.

It is certified that error appears in the above-identified patent and that said Letters Patent is hereby corrected as shown below:

Column 11, line 8, change “folder its” to --folder if its--

Signed and Sealed this

Fourteenth Day of November, 2006

JON W. DUDAS
*Director of the United States Patent and Trademark Office*